United States Patent
Ferren et al.

(10) Patent No.: US 10,212,484 B2
(45) Date of Patent: Feb. 19, 2019

(54) TECHNIQUES FOR A DISPLAY NAVIGATION SYSTEM

(75) Inventors: Bran Ferren, Beverly Hills, CA (US); Schawn A. Jasmann, Los Angeles, CA (US); Cory J. Booth, Beaverton, OR (US); Genevieve Bell, Portland, OR (US); David B. Andersen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 242 days.

(21) Appl. No.: 13/819,310

(22) PCT Filed: Aug. 26, 2011

(86) PCT No.: PCT/US2011/049294
§ 371 (c)(1),
(2), (4) Date: Aug. 19, 2013

(87) PCT Pub. No.: WO2012/027645
PCT Pub. Date: Mar. 1, 2012

(65) Prior Publication Data
US 2013/0326399 A1    Dec. 5, 2013

Related U.S. Application Data

(60) Provisional application No. 61/377,588, filed on Aug. 27, 2010.

(51) Int. Cl.
*G06F 3/0482* (2013.01)
*H04N 21/63* (2011.01)
(Continued)

(52) U.S. Cl.
CPC ............. *H04N 21/632* (2013.01); *G01S 5/20* (2013.01); *G06F 3/017* (2013.01); *G06F 3/0346* (2013.01);
(Continued)

(58) Field of Classification Search
CPC ............................ G06F 3/0485; G06F 3/0482
(Continued)

(56) References Cited

U.S. PATENT DOCUMENTS 5,594,469 A     1/1997   Freeman et al.
6,175,362 B1 *  1/2001   Harms ............... H04N 5/44543
                                                   348/563
(Continued)

OTHER PUBLICATIONS

International Search Report and Written Opinion received for PCT Patent Application No. PCT/US2011/049294, dated Apr. 24, 2012, 9 pages.
(Continued)

*Primary Examiner* — Phenuel S Salomon

(57) ABSTRACT

In an embodiment, a plurality of categories may be presented in a first ribbon on an electronic display. The plurality of categories may be scrollable through an active category slot in a fixed position in the first ribbon. A category positioned in the active category slot may be determined from the plurality of categories. A plurality of media objects may be presented based on the category. The plurality of media objects may be positioned in a second ribbon and scrollable through an active media object slot in a fixed position in the second ribbon. Other embodiments are described and claimed.

26 Claims, 9 Drawing Sheets

(51) Int. Cl.

| | |
|---|---|
| *H04N 21/437* | (2011.01) |
| *G06F 3/041* | (2006.01) |
| *H04N 21/422* | (2011.01) |
| *H04N 21/45* | (2011.01) |
| *G06K 9/32* | (2006.01) |
| *H04N 5/445* | (2011.01) |
| *H04N 21/431* | (2011.01) |
| *H04N 21/654* | (2011.01) |
| *G08C 17/00* | (2006.01) |
| *G08C 17/02* | (2006.01) |
| *G08C 19/00* | (2006.01) |
| *G06F 3/048* | (2013.01) |
| *G06N 5/02* | (2006.01) |
| *G01S 5/20* | (2006.01) |
| *H04N 21/488* | (2011.01) |
| *H04N 5/91* | (2006.01) |
| *H04N 5/44* | (2011.01) |
| *G06F 3/0485* | (2013.01) |
| *H04L 29/06* | (2006.01) |
| *G06Q 30/02* | (2012.01) |
| *H04N 21/436* | (2011.01) |
| *H04N 21/443* | (2011.01) |
| *G06F 3/01* | (2006.01) |
| *G06F 3/038* | (2013.01) |
| *G06F 3/0481* | (2013.01) |
| *H04N 21/482* | (2011.01) |
| *G06F 3/0346* | (2013.01) |
| *H04N 21/4147* | (2011.01) |
| *H04N 21/433* | (2011.01) |
| *G06F 3/0484* | (2013.01) |
| *H04N 21/81* | (2011.01) |
| *H04N 21/475* | (2011.01) |

(52) U.S. Cl.
CPC ............ *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0484* (2013.01); *G06F 3/0485* (2013.01); *G06K 9/3266* (2013.01); *G06N 5/02* (2013.01); *G06Q 30/0201* (2013.01); *G08C 17/00* (2013.01); *G08C 17/02* (2013.01); *G08C 19/00* (2013.01); *H04L 65/403* (2013.01); *H04N 5/4403* (2013.01); *H04N 5/44504* (2013.01); *H04N 5/91* (2013.01); *H04N 21/4147* (2013.01); *H04N 21/42204* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4508* (2013.01); *H04N 21/4516* (2013.01); *H04N 21/4532* (2013.01); *H04N 21/482* (2013.01); *H04N 21/4882* (2013.01); *H04N 21/63* (2013.01); *H04N 21/654* (2013.01); *G06F 2203/04804* (2013.01); *G08C 2201/32* (2013.01); *G08C 2201/40* (2013.01); *H04N 21/4755* (2013.01); *H04N 21/8133* (2013.01); *H04N 2005/44556* (2013.01)

(58) Field of Classification Search
USPC .......................................................... 715/781
See application file for complete search history.

(56) References Cited

U.S. PATENT DOCUMENTS

| | | | |
|---|---|---|---|
| 6,538,672 B1* | 3/2003 | Dobbelaar | H04N 5/44543 348/E5.105 |
| 6,678,891 B1* | 1/2004 | Wilcox | G06Q 30/0601 348/E5.105 |
| 6,910,191 B2* | 6/2005 | Segerberg | H04N 5/44543 348/E5.105 |
| 7,308,653 B2 | 12/2007 | Lin-Hendel | |
| 2001/0025201 A1* | 9/2001 | Weishut | G05B 15/02 700/17 |
| 2002/0196268 A1 | 12/2002 | Wolff et al. | |
| 2003/0001907 A1* | 1/2003 | Bergsten | G06F 3/0482 715/853 |
| 2003/0090524 A1 | 5/2003 | Segerberg et al. | |
| 2003/0169302 A1* | 9/2003 | Davidsson | G06F 3/04886 715/810 |
| 2004/0153557 A1* | 8/2004 | Shochet et al. | 709/229 |
| 2004/0216160 A1* | 10/2004 | Lemmons | H04N 5/44543 725/46 |
| 2004/0233239 A1* | 11/2004 | Lahdesmaki | 345/810 |
| 2005/0212911 A1* | 9/2005 | Marvit et al. | 348/154 |
| 2005/0235209 A1* | 10/2005 | Morita et al. | 715/716 |
| 2005/0243062 A1 | 11/2005 | Liberty | |
| 2006/0236251 A1* | 10/2006 | Kataoka | G06F 3/0481 715/757 |
| 2007/0239566 A1 | 10/2007 | Dunnahoo et al. | |
| 2008/0022228 A1* | 1/2008 | Kwon | G06F 3/04817 715/838 |
| 2008/0092171 A1* | 4/2008 | Roberts | G06F 3/0482 725/46 |
| 2008/0250312 A1* | 10/2008 | Curtis | 715/700 |
| 2009/0019369 A1* | 1/2009 | Borovsky | G06F 3/04883 715/736 |
| 2009/0089834 A1* | 4/2009 | Parker | H04N 5/44543 725/39 |
| 2009/0100380 A1* | 4/2009 | Gardner | G06F 3/0483 715/854 |
| 2009/0158203 A1 | 6/2009 | Kerr et al. | |
| 2009/0271283 A1* | 10/2009 | Fosnacht et al. | 705/26 |
| 2010/0001960 A1 | 1/2010 | Williams | |
| 2010/0175022 A1* | 7/2010 | Diehl et al. | 715/784 |
| 2010/0180305 A1 | 7/2010 | Migos | |
| 2010/0199306 A1* | 8/2010 | Colter | G06F 3/0483 725/38 |
| 2010/0229200 A1* | 9/2010 | Moreau | G06F 3/0482 725/44 |
| 2010/0333135 A1* | 12/2010 | Lau | H04N 5/4403 725/39 |
| 2011/0026765 A1 | 2/2011 | Ivanich et al. | |
| 2011/0161882 A1* | 6/2011 | Dasgupta et al. | 715/830 |

OTHER PUBLICATIONS

Office Action received for Korean Patent Application No. 2013-7007849, dated Feb. 28, 2014, 3 pages English translation.
Extended European Search Report received for European Patent Application No. 11820709.1, dated Feb. 12, 2015, 8 pages.

* cited by examiner

700

PRESENT A PLURALITY OF CATEGORIES IN A VERTICAL COLUMN ON AN ELECTRONIC DISPLAY
702

RECEIVE A GESTURE FROM A USER
704

DETERMINE A CATEGORY FROM THE PLURALITY OF CATEGORIES
706

PRESENT A PLURALITY OF MEDIA OBJECTS IN A HORIZONTAL ROW BASED ON THE CATEGORY
708

*FIG. 7*

TECHNIQUES FOR A DISPLAY NAVIGATION SYSTEM

RELATED APPLICATIONS

This application claims priority to U.S. Provisional Patent Application Ser. No. 61/377,588 filed Aug. 27, 2010, which is incorporated herein by reference in its entirety.

BACKGROUND

Current entertainment systems require a user to access television programming, the internet, and personal media in three separate interfaces. Additionally, menus used in each of these systems typically are intrusive. For example, when a user views a menu on a television or computer display, the menu typically covers the entire display blocking the multimedia stream. Other times, the menu covers the bottom part of the current multimedia stream without regard for what is being presented on the bottom portion of the display. By covering up the bottom portion of the display, a user misses important information on tickers positioned at the display.

Furthermore, menus are often poorly organized and contain very little information. A user either goes through a long list by date, channels and/or endlessly searches to find a particular file, program or movie. The menus for movies and television programs typically include only text. This makes it difficult to quickly find a desired program or movie. Also, the text provides very little information. Usually the text includes only the name of the program or movie and a quick summary.

Accordingly, there may be a need for improved techniques to solve these and other problems.

BRIEF DESCRIPTION OF THE DRAWINGS

FIG. 7 illustrates one embodiment of a logic flow.

DETAILED DESCRIPTION

Figure 1:
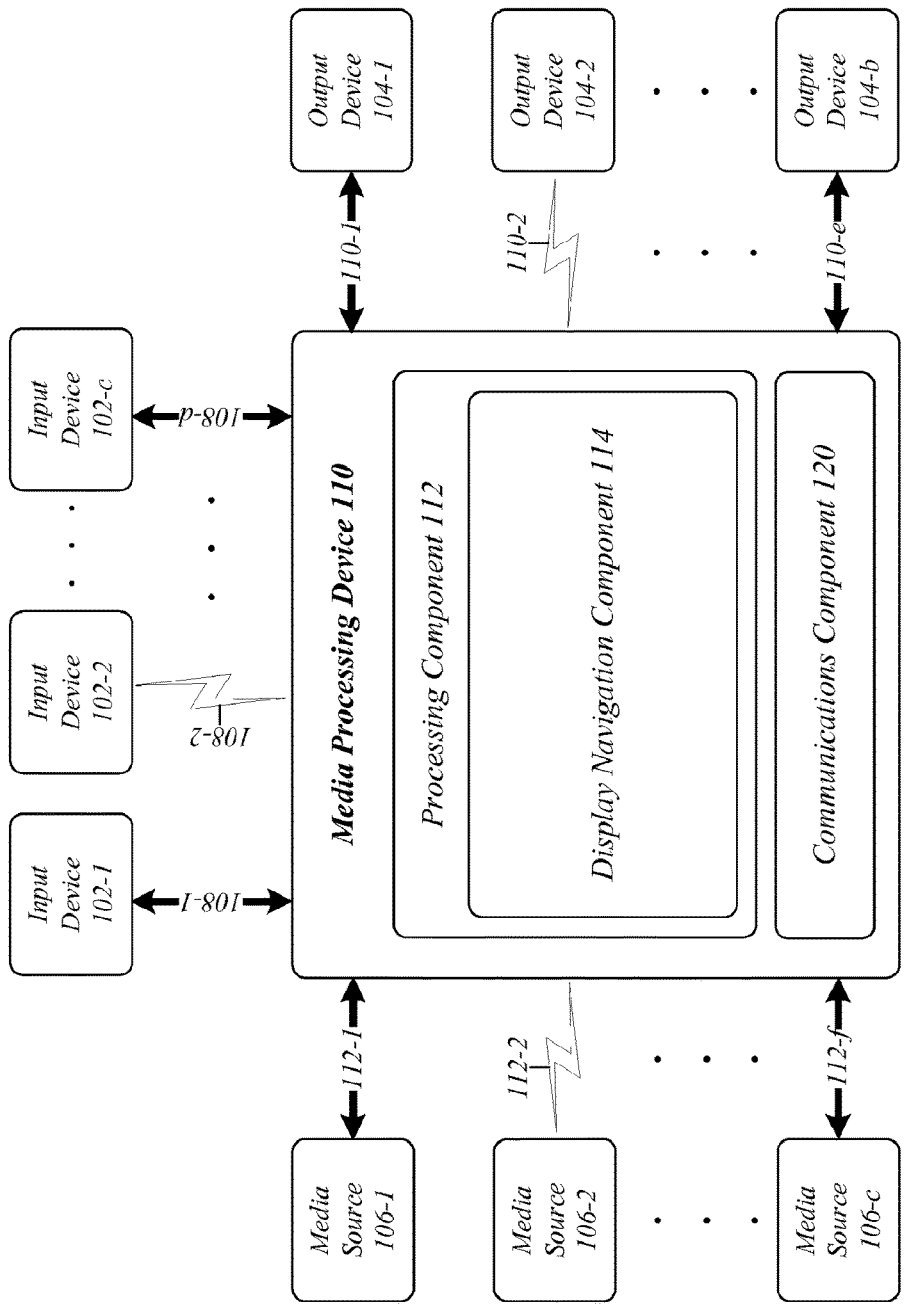
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience engaging, efficient and enriched through a facile and discoverable user interface. A unified interface may combine the best features, functions and capabilities of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments. By integrating the best of class functions, features and capabilities from multiple entertainment systems, the resulting user interface expands upon the limits of the originating singular interfaces.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in a functionally seamless and easily understood manner.

The digital home system may include, in various embodiments, a multi-axis integrated on-screen navigation allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to techniques for a display navigation system. In one embodiment, for example, the display navigation system may include a dynamic dual ribbon matrix graphical user interface (GUI) view. The dynamic dual ribbon matrix GUI view may include a first ribbon and a second ribbon. In an embodiment, a dynamic dual ribbon matrix GUI view may include a vertical column as a first ribbon and a horizontal row as a second ribbon. In an embodiment, the dynamic dual ribbon matrix GUI view may include a plurality of horizontal ribbons and/or a plurality of vertical ribbons. A plurality of categories may be presented in a ribbon on a display. In an embodiment, a plurality of categories may be presented in a vertical column on a display. The categories may be scrollable through an active category slot positioned in a fixed position in the ribbon. In an embodiment, a plurality of media objects based on a category, from the plurality of categories, positioned in the active category slot, may be presented in a second ribbon. In an embodiment, the plurality of media object may be presented in a horizontal row. The media objects may be scrollable through an active media object slot in a fixed position in the second ribbon. Thus, a user may easily select a media object with minimal disruption to a multimedia stream. In an embodiment, a multimedia stream may include a live feed. In an embodiment, information about a media object maybe displayed above and/or below a media ribbon.

In an embodiment, a user may be watching a multimedia stream on the display in the digital home system. A multimedia stream may be the type of entertainment currently displayed on a user's display. In an embodiment, a multimedia stream may be a movie or a television show. In an embodiment, a multimedia stream may be a computer game played by a user. In an embodiment, a multimedia stream may be a home video or a picture on the display. In an embodiment, a multimedia stream may be a music video. In an embodiment, a multimedia stream may be user created and/or shared content, such as, but not limited to computer graphics animations.

In an embodiment, a user may decide that he/she would like to view other entertainment options. As a result, the user may use a display navigation system to present a dynamic dual ribbon matrix GUI view. In an embodiment, the dynamic dual ribbon matrix GUI view may include a category ribbon, a media object ribbon, an information panel, an action menu and the multimedia stream. In an embodiment the dynamic dual ribbon matrix GUI view may include a plurality of vertical ribbons and/or a plurality of horizontal ribbons. The information panel may be positioned adjacent to the category ribbon and an action menu may be positioned below the information panel. As a result of the category ribbon, the media object ribbon, the information panel and the action menu, the multimedia stream may be reduced in size so that the category ribbon, the media object ribbon, the information panel and the action menu do not overlap or cover the multimedia stream. In an embodiment, no part of the multimedia stream may be covered. In an embodiment, the multimedia stream may be presented in the upper right hand corner of the display.

A user may scroll through the various categories in the category ribbon. Before a category is selected, an information panel and an action menu may be presented which provides information and action items based on the multimedia stream. A category may be selected. The media objects presented in the media object ribbon may be based on the selected category. A media object may be selected. The information in the information panel and the action items in the action menu may be based on the selected media object.

As a result, the embodiments can improve affordability, scalability, modularity, extendibility, or interoperability for an operator, a content provider, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-a, one or more output devices 104-b, and one or more media sources 106-c. The media processing device 110 may be communicatively coupled to the input devices 102-a, the output devices 104-b, and the media sources 106-c via respective wireless or wired communications connections 108-d, 110-e and 112-f.

It is worthy to note that "a" and "b" and "c" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

While various embodiments refer to input devices 102-a providing information to media processing device 110 and output devices 104-b receiving information from media processing device, it should be understood that one or more of the input devices 102-a and output device 104-b may allow for the exchange of information to and from media processing device 110 via their respectively connections 108-d and 110-e. For example, one or more of input devices 102-a may be operative to provide information to media processing device 110 and to receive information from media processing device 110. In various embodiments, one or more of output devices 104-b may be operative to receive information from media processing device 110 and may also be operative to provide information to media processing device 110. Similarly, there may be a bi-directional exchange between the media processing device 110 and media sources 106-c. For instance, a media source 106-c may be operative to provide media information to the media processing device 110 and to receive information from the media processing device 110. An example of this would be a video on demand (VOD) application implemented by the media processing device 110. The embodiments are not limited in this context.

In various embodiments, the media processing system 100 may include one or more input devices 102-a. In general, each input device 102-a may comprise any component or device capable of providing information to the media processing device 110. Examples of input devices 102-a may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-b. An output device 104-b may comprise any electronic device capable of reproducing, rendering or presenting media content for consumption by a human being. Examples of output devices 104-b may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

In one embodiment, for example, the media processing system 100 may include a display 104-1. The display 104-1 may comprise any analog or digital display capable of presenting media information received from media sources 106-c. The display 104-1 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

In various embodiments, the media processing device 110 may comprise a display navigation component 114. The display navigation component 114 is shown as part of media processing device 110 for purposes of illustration and not limitation. It should be understood that the display navigation component 114 could be located in other devices, components or nodes of media processing system 100 in various embodiments and still fall within the described embodiments.

Figure 2:
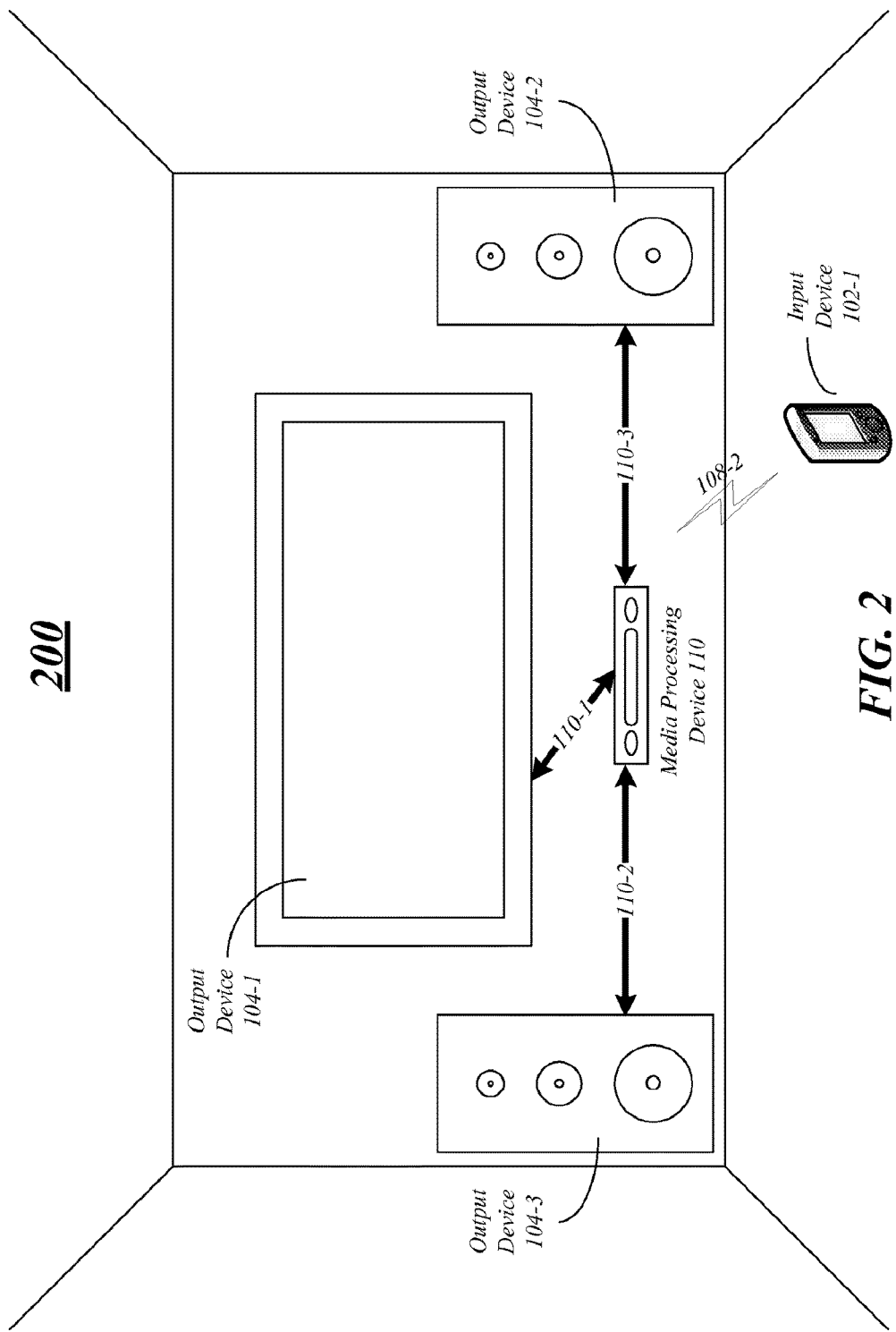
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown). The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

Figure 3:
FIG. 3 illustrates one embodiment of a display navigation component

FIG. 3 illustrates one embodiment of a display navigation component 300. The display navigation component 300 may present a dynamic dual ribbon matrix graphical user interface (GUI) view. The dynamic dual ribbon matrix GUI view may allow a user to select a media object with minimal disruption to the multimedia stream presented on other portions of the GUI view. In an embodiment, the multimedia stream may be one or more of a television program, a movie, a computer game, a video game, a photograph and/or a home video, among other examples.

The display navigation component 300 may provide a dynamic dual ribbon matrix GUI view as a user interface for the media processing device 110. The dynamic dual ribbon matrix GUI view may be implemented as a two-dimensional (X-Y) matrix. In an embodiment, one axis may list one or more categories. In an embodiment, the Y axis may list one or more categories. In an embodiment, the other axis may list media objects associated with each of the categories. In an embodiment, the X axis may list media objects associated with each of the categories.

The display navigation component 300 may include a category presentation component 310. The category presentation component 310 may determine the categories listed in the vertical column of the matrix. In order to select a media object, a user may first select a category from the category ribbon. In an embodiment, the categories determined by the category presentation component 310 may include, but are not limited to, "Movies", "Sports", "Shopping", "People", "Favorites" and/or a "Personal Channel". In an embodiment, the category presentation component 310 may present a category using text and/or an icon.

The category presentation component 310 may present a category ribbon with an active category slot. The category in the active category slot may be the active category. In an embodiment, the category presentation component 310 may accentuate the active category. For example, the active category may be enlarged and/or highlighted and the other categories in the category ribbon may be darkened. Other visual modifications may be implemented as well. In an embodiment, the category presentation component 310 may receive input from a user that the active category was selected.

The display navigation component 300 may include a media object presentation component 315. In an embodiment, associated with each category may be one or more media objects. The media object presentation component 315 may present media objects based on an active and/or selected category. In an embodiment, the media object presentation component may present media objects based on the personalized entertainment channel.

The media object presentation component 315 may present the media objects in a second ribbon. In an embodiment, the media object presentation component 315 may present the media objects in a horizontal row. A user may select a media object from the media object ribbon. A media object may be, but is not limited to, a movie, a photograph, a video game, a computer game, a home video, a song, an audio recording, a website, a network location and/or a television program. In an embodiment, the media object presentation component 315 may present a media object by a title and a thumbnail image. In an embodiment, live video may be viewed within the thumbnails. In an embodiment, pre-recorded or captured video may be viewed within the thumbnails. In an embodiment, the thumbnail may present frames which the system periodically grabs from the video feed associated with the media object.

In an embodiment, the media object ribbon may include an active media object slot. The media object in the active media object slot may be the active media object. In an embodiment, the media object presentation component 315 may accentuate the active media object. For example, the active media object may be enlarged and/or highlighted and the other media objects in the media object ribbon may be darkened, among other visual modifications. In an embodiment, the media object presentation component 315 may receive input from a user that the active media object was selected.

The display navigation component 300 may include an information panel and action menu presentation component 320. The information panel and action menu presentation component 320 may present information and action items based on either a current multimedia stream and/or a selected media object. In an embodiment, while the category is being chosen, the information panel and action menu presentation component 320 may present information about and potential actions for the multimedia stream. In an embodiment, when the category and the active media object have been selected, the information panel and action menu presentation component 320 may present information about the active media object. In an embodiment the information panel and action menu presentation component 320 may present information such as, but not limited to, title, summary, channel number, release date, director, writer or producer, and/or stars or actors. In an embodiment, the information panel and action menu presentation component 320 may present action items such as, but not limited to, future replays/episodes, search/info-surf, related viewing, bookmark/favorites, and record/playback.

Figure 4:
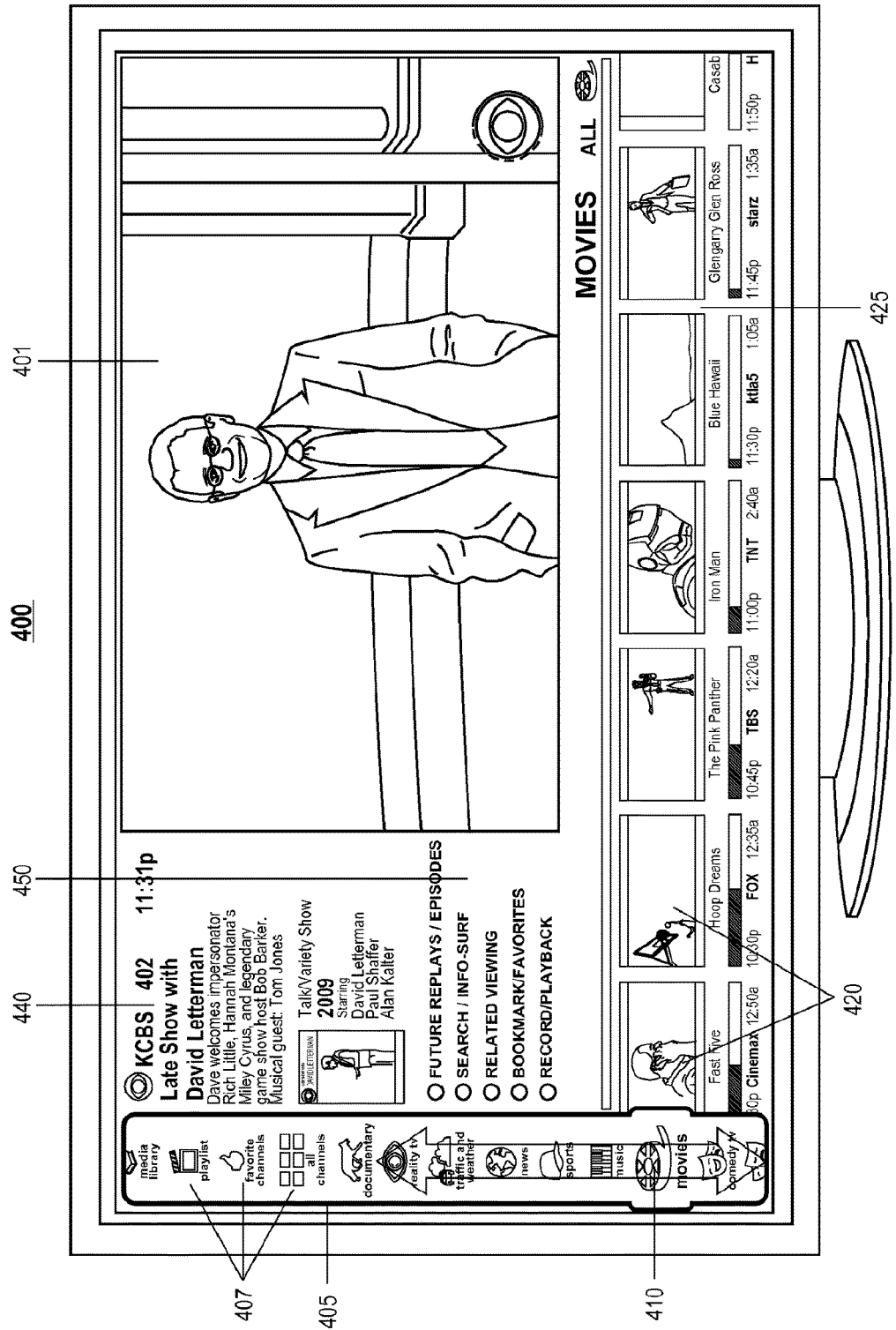
FIG. 4 illustrates one embodiment of a category selection using the dynamic dual ribbon matrix GUI view.

FIG. 4 illustrates one embodiment of selecting a category using the dynamic dual ribbon matrix GUI view 400. In an embodiment, a user may be watching a multimedia stream. The user may decide that he/she would like to view what other options are available for entertainment. The user may use a display navigation system to invoke the dynamic dual ribbon matrix GUI view 400. In an embodiment, the dynamic dual ribbon matrix GUI view 400 may be presented on an electronic display, such as the output device 104-1, when a user activates an input device 102-c, such as when a user presses a button on a remote control, touches a particular icon, makes a particular touch on a touch sensitive device and/or makes a particular gesture to a gesture recognition system to signal that a user wants to view the dynamic dual ribbon matrix GUI view.

For example, as shown in FIG. 4, the Late Show with David Letterman® may be the multimedia stream 401 on the display. Prior to the dynamic dual ribbon matrix GUI view, the multimedia stream may cover the entire display. The user may use the display navigation system to invoke the dynamic dual ribbon matrix GUI view 400. In an embodiment, the multimedia stream 401 may be reduced in size and moved to the upper right corner. In an embodiment, the dynamic dual ribbon matrix GUI view 400 may be implemented so as to minimally interfere with the multimedia stream 401.

In an embodiment, the category ribbon 405 may present one or more categories 407. In an embodiment, the category ribbon 405 may be a vertical ribbon. In an embodiment, the category ribbon 405 may be a narrow vertical ribbon with a single category in each row. In an embodiment, a user may scroll the vertical ribbon to view various categories. In an embodiment, the user may scroll the ribbon up and/or down to select a category. In an embodiment, the category ribbon 405 may not overlap the multimedia stream. In an embodiment, the category ribbon 405 may be positioned at the left edge of the display so as to not interfere with the multimedia stream 401.

The categories 407 presented in the category ribbon 405 may include, but are not limited to, a media library, a playlist, favorite channels, all channels, documentaries, reality television, traffic and weather, news, sports, music, movies and/or comedy television.

In an embodiment, a category 407 in the category ribbon 405 may be presented as one or more of a graphic, a picture, an icon, text, numbers and/or letters. In an embodiment, the category may be depicted by an animated icon. In an embodiment, a category 407 may be depicted by an icon and/or text in order to assist a user in quickly identifying a category.

In an embodiment, each category 407 in the category ribbon 405 may be positioned in a row. In an embodiment, there may be only one category 407 in a row. A user may scroll the categories 407 up and/or down from one row to an adjacent row. By having a user scroll the categories 407 up and/or down, the dynamic dual ribbon matrix GUI view may minimally interfere with the multimedia stream. In an embodiment, a user may scroll the categories 407 in the category ribbon 405 using a Y-axis input.

In an embodiment, a user may scroll the category ribbon 405 using an input device 102-1 such as a keyboard, a remote control or other control device. For example, a user may press an up-arrow or down-arrow button on a remote control or keyboard. For example, a user may move a rocker button or joystick on a control in a vertical direction.

In an embodiment, a user may scroll the category ribbon 405 using an input device 102-2 such as a touch sensitive device. In an embodiment, the user may perform a vertical touch on a touch sensitive device. In an embodiment, a touch sensitive device may include, but is not limited to, a smart phone or a tablet with a passive or active touch-screen.

In an embodiment, a user may scroll the category ribbon 405 using an input device 102-3 such as a gesture recognition system. In an embodiment, a gesture recognition system may detect or sense a gesture by a user. In an embodiment, gestures may be detected by a pair of stereo cameras within a set-top box, accelerometers within a control held by a user and/or other means of detecting user posture. In an embodiment, a gesture sensor device may be used with the gesture recognition system. In an embodiment, a particular gesture may indicate or signal a particular command. For example, a "scroll up" command may be indicated by a user moving his hands upward. For example, a "scroll down" command may be indicated by a user moving a control associated with a gesture recognition system rapidly downward. In an embodiment, a gesture-based command may be supplemented with acoustic cues such as a clap. The embodiments are not limited in this context.

In an embodiment, a user's gesture may be received by the gesture recognition system. For example, a user may clasp his/her hands. The gesture may be determined to be selecting the active category from the active category slot. The media processing device may present a plurality of media objects in the media object ribbon based on the received gesture.

In an embodiment, by allowing a user to scroll the category ribbon 405, there may be more categories 407 than visible rows. The number of categories 407 available for selection can exceed the number of categories visible at any one time, with categories 407 departing the bottom (or top) of the display as previously hidden categories 407 enter the top (or bottom) of the display during upward (or downward) scrolling. As a user scrolls the category ribbon 405, the user may view categories 407 that were not previously presented on the display.

In an embodiment, the category ribbon 405 may include an active category slot 410. In an embodiment, each category 407 in the category ribbon 405 may scroll through the active category slot 410. In an embodiment, the active category slot 410 may remain in a fixed position in the category ribbon 405. During scrolling, the position of the active category slot 410 may remain in a fixed or defined position as the categories 407 in the category ribbon 405 slide through the active category slot 410.

In an embodiment, the category 407 positioned in the active category slot 410 may be referred to as an active category. In an embodiment, the active category may be used to determine the available media objects 420 in the media object ribbon 425. In an embodiment, the media objects 420 presented in the media object ribbon 425 may be based on the active category.

In an embodiment, the active category may be visually differentiated from other categories in the category ribbon 405. In an embodiment, when a category 407 enters the active category slot 410, the category 407 may be brightened, enlarged, highlighted or otherwise accentuated. For example, the category positioned in the active category slot 410 may be larger than the categories positioned in the category ribbon 405.

For example, in FIG. 4, the category "Movie" 407 may be scrolled into the active category slot 410. As a result of the category "Movie" 407 being positioned in the active category slot 410, the category "Movie" 407 is enlarged and brightened. When the category "Movie" 407 exits the active category slot, 410, the category "Movie" 407 may be reduced in size and the category "Music" 407 or the category "Comedy Television" 407 may enter the active category slot 410 and be enlarged.

In an embodiment, the active category slot 410 may be positioned near the middle of the category ribbon 405. In an embodiment, the active category slot 410 may not be positioned at the ends of the category ribbon 405. In an embodiment, the active category slot 410 may be positioned at the second or third bottom-most visible slot. Allowing a user to view other categories both above and below the category 407 in the active category slot 410 eases the scrolling operation. Positioning the active category in the second or third bottom-most visible slot may leave a large amount of unperturbed space for the multimedia stream.

In an embodiment, an active category may be selected. In an embodiment, only categories in the active category slot may be selected. However, categories may pass through the active category slot 410 without being selected. In order to select the category, a user may perform an action indicating that the category 407 in the active category slot 410 is selected.

A user may indicate the selection via one or more of, but not limited to, a remote control, keyboard, a control pad, a touch sensitive device and/or a gesture recognition system. For example, a user may gesture by pointing his/her finger towards the electronic display. The user may point his/her finger in a horizontal motion to begin scrolling the category ribbon. The user may place all fingers and palm towards the electronic display when the user wants the scrolling to stop. For example, the user may snap his/her fingers to select the category in the active category slot. Other gestures may be implemented as well.

In an embodiment, a media object ribbon may not be displayed until an active category is affirmatively selected. For example, a user may scroll the category ribbon to slide (and accentuate) one category after another in the active category slot. The media object ribbon may be displayed and/or raised after a user affirmatively selects the active category in the active category slot.

Upon selection of a category, the active category in the active category slot 410 may be further accentuated. In an embodiment, upon selection of the active category, the categories above and below the selected active category may be hidden from view. In an embodiment, upon selection of an active category, the rest of the categories above and below the selected category in the active category slot 410 may be lightened and/or grayed-out. As shown in FIG. 4, the category "Movie" has been selected and the other categories have been grayed-out.

In an embodiment, an information panel 440 and an action menu 450 may be presented on the dynamic dual ribbon matrix GUI view 400. In an embodiment, the information panel 440 and the action menu 450 may be presented on the display when the dynamic dual ribbon matrix GUI view 400 appears. In an embodiment, the information panel 44, the action menu 450, the category ribbon 405 and the media object ribbon 425 may be presented simultaneously.

In an embodiment, the information panel 450 may be presented immediately to the right of the category ribbon 405. In an embodiment, the action menu 450 may be presented immediately above and/or below the information panel 440. The action menu 450 and the information panel 440 may be presented immediately to the right of the category ribbon 405. In an embodiment, the information panel 440 and the action menu 450 may leave ample room for the multimedia stream 401. In an embodiment, the information panel and the action menu may be presented on the upper left portion of the display and the multimedia stream 401 may be presented on the upper right portion of the display.

The information panel 440 and the action menu 450 may be presented prior to a user selecting a category from the category ribbon 405. Prior to selecting a category, the information panel 440 and the action menu 450 may present information and/or action items based on the multimedia stream 401.

For example, in FIG. 4, the multimedia stream 401 may be the Late Show with David Letterman®. The information panel 440 may include information such as, but not limited to, the station symbol along with the station number, the title of the program, a summary of the program, the type of program and/or the stars of the program. For example, in FIG. 4, the Information Panel may present the CBS® icon, the station name KCBS®, the channel number 402, the time 11:31 p, the title of the program the Late Show with David Letterman®, a summary, the type of program "Talk/Variety Show", the year 2009, and the stars: David Letterman®, Paul Shaffer and Alan Kalter.

The action menu 450 may present menu items based on the multimedia stream, the Late Show with David Letterman®, 401. For example, the action menu 450 may include action items such as, but not limited to future replays/episodes, search/info-surf, related viewing, bookmark/favorites, and record/playback.

Figure 5:
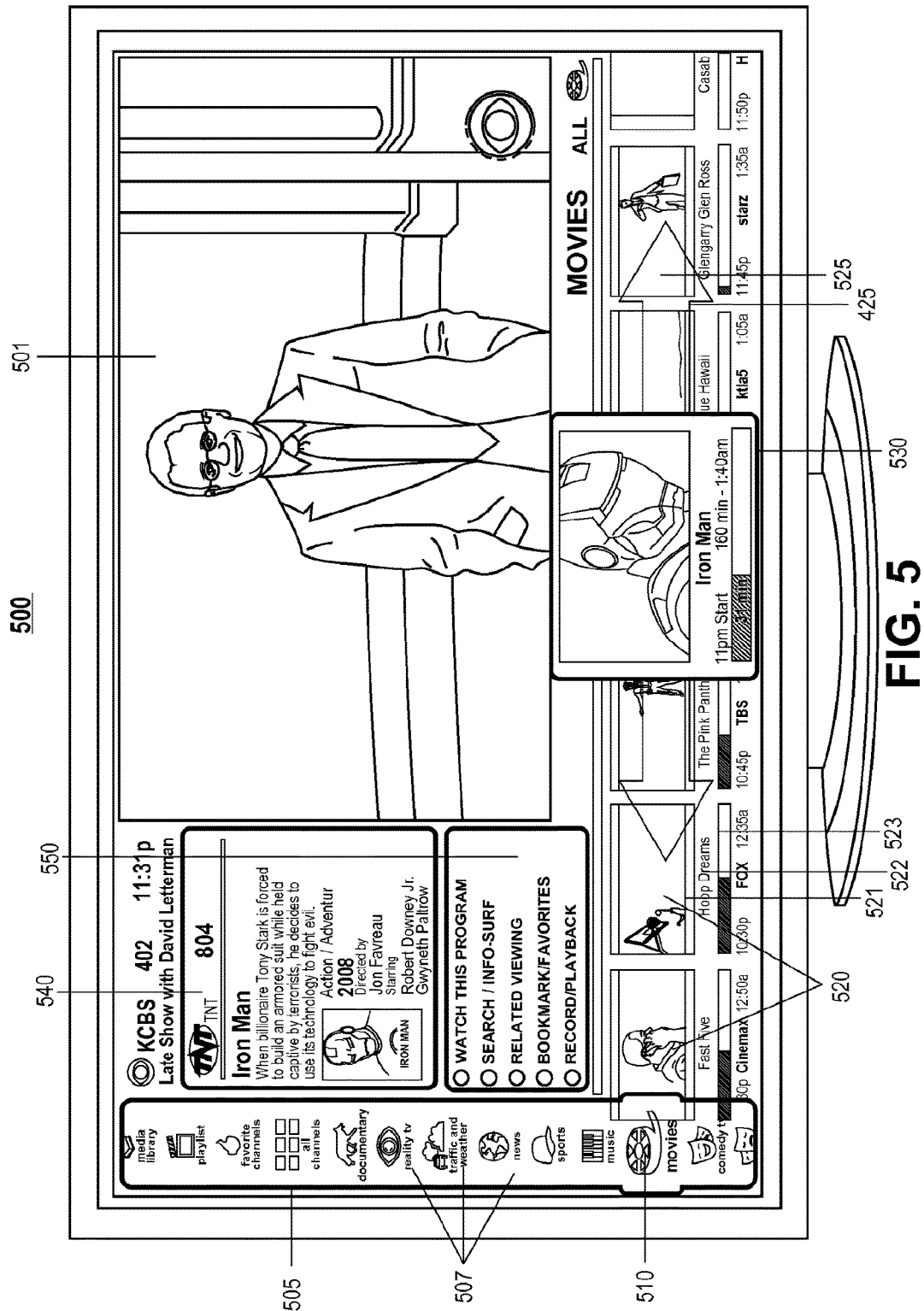
FIG. 5 illustrates one embodiment of a media object selection using the dynamic dual ribbon matrix GUI view.

FIG. 5 illustrates one embodiment of selecting a media object using the dynamic dual ribbon matrix GUI view 500. In an embodiment, media objects 520 may be presented in a media object ribbon 525. In an embodiment, the media objects 520 presented may be based on the active category, or the category 507 positioned in the active category slot 510. In an embodiment, the media object ribbon 525 may be a scrollable ribbon of media objects 520.

In an embodiment, the display of the available media objects 525 based on the active category may be presented in a media object ribbon. In an embodiment, the media object ribbon may be a horizontal row. In an embodiment, the media object ribbon 525 may be constrained to a relatively thin horizontal ribbon so as to not interfere with the multimedia stream 501 presented on the display. In an embodiment, the horizontal ribbon may be presented near the bottom of the display. In an embodiment, the media object ribbon 525 may be a scrollable ribbon of media objects 520 at the bottom edge of the display. In an embodiment, the media object ribbon 525 and the category ribbon 505 may not overlap the multimedia stream 501. In an embodiment, the media object ribbon 525 may intersect the category ribbon 505 at the active category slot 510.

Media objects 520 may include, but are not limited to, a movie, a photograph, a video game, a computer game, a home video, a song, an audio recording, a website, a network location and/or a television program. In an embodiment, the media object ribbon 525 may present media objects 520 based on the category 507 in the active category slot 510. In an embodiment, a media object 520 may be presented as a thumbnail image 521. In an embodiment, the media object 520 may include live video which may be viewed within the thumbnail image 521. In an embodiment, pre-recorded or captured video may be viewed within the thumbnail image 521. In an embodiment, the thumbnail image 521 may present frames of multimedia stream. The media object presentation component may periodically grab frames from the multimedia stream to use as the thumbnail image 521. In an embodiment, the thumbnail image 521 may include highlights of the multimedia stream.

In an embodiment, the media object 520 may also include information, such as, but not limited to, title 521 and time 523. Time 523 may include, but is not limited to, the time a program or movie starts and/or stops and the amount of time left in a program or movie currently being broadcast.

A user may navigate the dynamic dual ribbon matrix GUI view 500 by scrolling the categories 507. For each category 507 in the active category slot 510, the media object ribbon 525 may present one or more media objects 520 based on that active category. In an embodiment, accentuating the active category in the category ribbon 505 may emphasize that the media objects 520 depicted in the media object ribbon 525 are based on that active category.

In an embodiment, when the active category changes, the media objects in the media object ribbon 525 may change. In an embodiment, each category may have one or more different associated media objects. In an embodiment, an individual media object may appear in more than one category. The nature of the media object, however, may change based on context of the selected category. For example, a "Nearest" application may reveal the physical location of nearby contacts if selected within the "People" category, but reveal the nearest preferred theaters, stores, and restaurants if selected under the "Favorites" category.

In an embodiment, similar to the active category slot 510 in the category ribbon 505, the media object ribbon 525 may have an active media object slot 530. The media object 520 in the active media object slot 530 may be referred to as the active media object. In an embodiment, the active media object may be brightened, enlarged, highlighted or otherwise accentuated so as to differentiate the active media object from the other media objects 520 in the media object ribbon 525.

In an embodiment, the active media object slot 530 may be positioned near the middle of the media object ribbon 525 in order to allow a user to view other media objects 520 to both the right and left of the active media object. In an embodiment, positioning the active media object slot 530 towards the middle of the media object ribbon 525 may ease the scrolling operation.

As discussed above, a user may navigate the dynamic dual ribbon matrix GUI view 500 using one or more input devices 102-c, including a remote control, a touch sensitive device and/or a gesture recognition system. In an embodiment, when traversing the media object ribbon 525, the user may navigate to the left or right.

In an embodiment, an escape or a back input command may exit scrolling the media objects in the media object ribbon. In an embodiment, a back input command may re-enable category scrolling. In an embodiment, the back input command may occur when a user navigates upward and/or downward. In an embodiment, the back input command may occur as a result of a user's gesture with his or her body and/or with a gesture sensor device. In an embodiment, the back input command may occur as a result of a user pressing one or more buttons on a remote control. In an embodiment, the back input command may occur as a result of a user's touch on a touch sensitive device.

In an embodiment, as a result of a user navigating up or downward, the cursor may return to the category ribbon 505 and a new category 507 may be positioned in the active category slot 510. As a result of the new category in the active category slot 510, the media objects 520 presented in the media object ribbon 525 may change.

In an embodiment, a media object may be highlighted upon entering the active media object slot 530. A user may affirmatively select a media object 520 positioned in the active media object slot 530. In an embodiment, after a user selects a media object 520, the information panel 540 may include information based on the media object 520 positioned in the active media object slot 530.

In an embodiment, an information panel 540 and an action menu 550 may be associated with a media object 520 in the active media object slot 530. Information in the information panel 540 may be based on the active media object. Action items in the action menu 550 may be based on the active media object. In an embodiment, an information panel 540 and/or an action menu 550 may be associated with each media object 520 positioned in the active media object slot 530. In an embodiment, the information panel and the action menu based on the active media object may overlay an information panel and action menu based on the multimedia stream.

In an embodiment, the information panel 540 may include information about an active media object. The information provided in the information panel 540 may change based on the category of the media object 540. For example, if the media object 520 is a movie, the information panel 540 may include information, such as, but not limited to, the stars, director, release date and/or the running length of the movie. In an embodiment, the running length of the film may be extracted from the electronic programming guide. For example, if the media object 520 is a television program, the information panel 540 may include information, such as, but not limited to, the channel, the type of program, a summary of the program, the actors and/or actresses, the producer, the date it first aired and/or the length of the program. If the media object 520 is a picture, then the information panel 540 may include information, such as, but not limited to, the date taken, the type of camera used and/or the name of the person who took the picture. If the media object 520 is a song, then the information panel 540 may include information, such as, but not limited to, the date the song was released, the length of the song and/or the artist. The embodiments are not limited in this context.

For example, the active media object may be the movie Iron Man® and the information panel 540 may include information about the movie Iron Man®. The information panel 540 may include information such as, but not limited to, the channel and station number, the time, the title, a summary of the movie, the type of movie, the year released, the director and the stars. For example, in FIG. 5, the information panel 540 may present information such as, but not limited to, the TNT® icon, the station name TNT®, the channel number 804, the time 11:31 p, the title of the movie Iron Man®, a summary, the type of movie "Action/Adventure, the year of release 2008, the director John Favreau, and the starts: Robert Downy Jr. and Gwenth Paltrow.

In an embodiment, action items may be presented in the action menu 550. In an embodiment, the action menu 550 may include available operations based on the active media object. For example, the action menu may include action items, such as, but not limited to, recording options, bookmarking functions and/or internet-based operations.

For example, in FIG. 5, the action menu 550 may present action items such as, but not limited to, watch this program, search/info-surf, related viewing, bookmark/favorites, and record/playback.

In an embodiment, a user may select the active media object. In order to select the active media object, a user may perform an action indicating that the media object in the active category slot 510 is selected. A user may indicate the selection via a remote, keyboard, a control pad, a touch sensitive device and/or a gesture recognition system. For example, a user may gesture a selection of a media object by clasping both hands. The gesture may be received and the media object may be selected using the gesture recognition system and the media processing device.

In an embodiment, after user selects a media object, the user may chose an action item from the action menu 550. In an embodiment, after the media object is selected, one or more action items in the action menu may be highlighted 550. Once the user enters the action menu 550, a user may use vertical scrolling to select between the action items within the action menu 550.

If a user selects the "watch this program" action item, the multimedia stream and the dynamic dual ribbon matrix GUI view 500 may be replaced with the media which the active media object represents. For example, if the media object is the movie Iron Man®, then the display will present the channel that has the multimedia stream of the movie Iron Man®. If the media object is a picture, then the display will present the file containing the picture. If the media object is a television program then the display will present the channel that has the multimedia stream of the television program. The embodiments are not limited in this context.

In an embodiment, an escape or a back input command may cause a cursor to exit the action menu. In an embodiment, when a user is navigating the action menu 550 and a back input command is received, media object scrolling and/or category scrolling may be re-enabled. For example, a back input command may be a horizontal movement to scroll along the media objects in the media object ribbon. For example, a back input command may be a button on the underside of a remote control. Alternatively, a back input command may be a horizontal hand gesture by a user.

Figure 6:
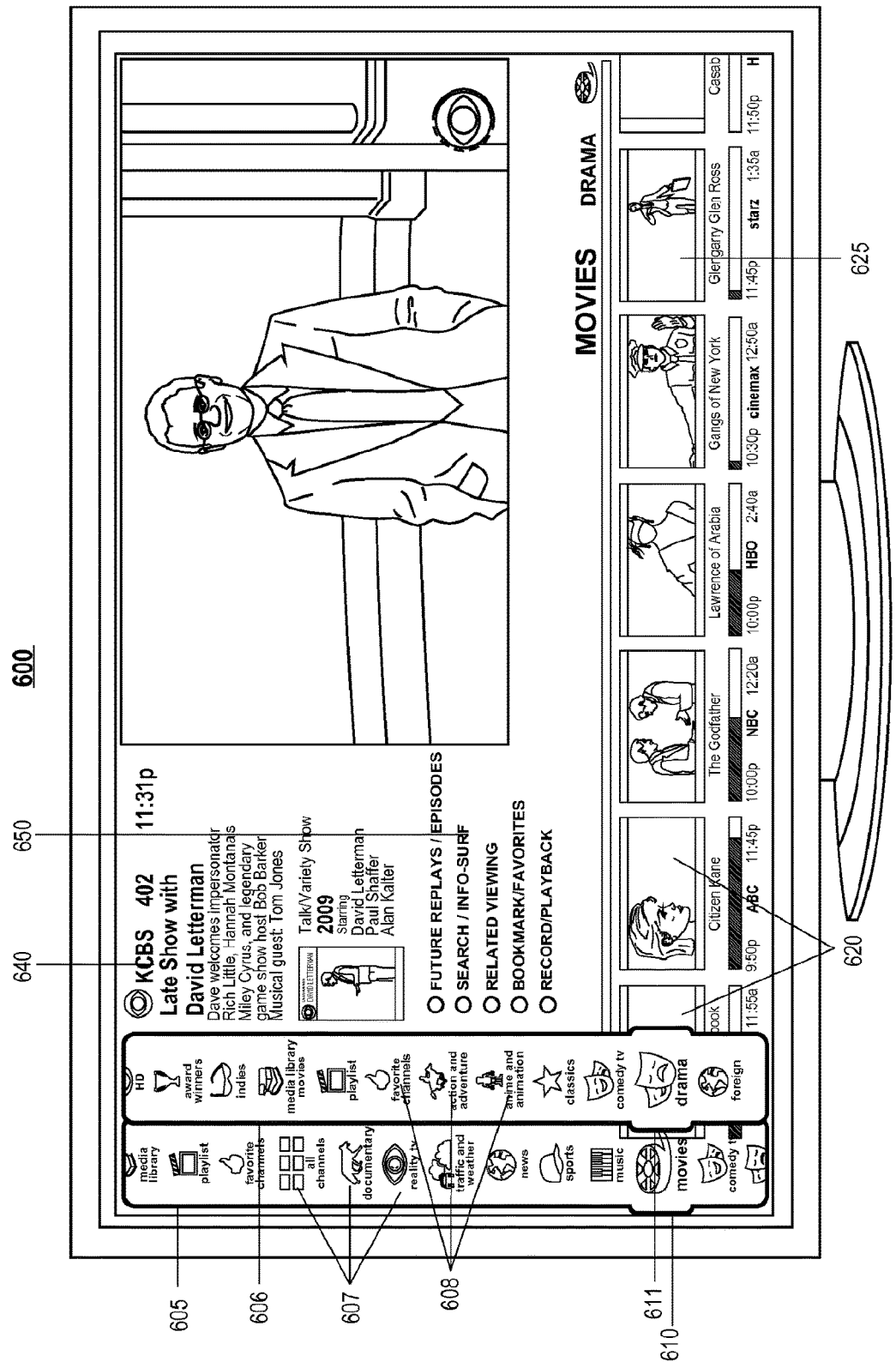
FIG. 6 illustrates one embodiment of a subcategory selection using the dynamic dual ribbon matrix GUI view.

FIG. 6 illustrates one embodiment of selecting a subcategory using the dynamic dual ribbon matrix GUI view 600. In an embodiment, media objects 620 may be further organized into subcategories. In an embodiment, subcategories 608 may be presented in a subcategory ribbon 606. In an embodiment, the subcategory ribbon 606 may be positioned alongside the category ribbon 605. In an embodiment, the subcategory ribbon 606 may be a subcategory column. In an embodiment, the subcategory column may be positioned immediately to the right of a category column. In an embodiment, a categorical hierarchy may be extended to any desired depth, subject only the available space provided by the display. In an embodiment, a single ribbon of top-level categories may suffice.

Referring to FIG. 6, a user may scroll the category ribbon 605. The user may scroll various categories 607 through the active category slot 610. A user may select the category in the active category slot 610. In an embodiment, a user may select the active category by clicking a button on a remote, doing a particular gesture and/or tapping a touch sensitive device.

In an embodiment, after the user selects a category 607, a subcategory ribbon 606 based on to the selected category may be presented. For example, in FIG. 6, the "Drama" subcategory may be presented after the "Movies" category was selected from the category ribbon 605. In an embodiment, the information panel 640 and action menu 650 may be shifted or moved to the right to provide space for the subcategories ribbon 606. In an embodiment, the multimedia stream 601 may be correspondingly reduced in size in order to present the subcategories ribbon 606. In an embodiment, a user may scroll the subcategory ribbon 606 vertically in a manner similar to scrolling through the category ribbon 605. In an embodiment, an escape or back input may remove the subcategory ribbon 606 and may allow a user to resume scrolling category ribbon 605.

In an embodiment, a subcategory ribbon 606 may include an active subcategory slot 611, similar to the active category slot 610. A user may scroll the subcategories 608 in the subcategory ribbon 606 and select a subcategory for the active subcategory slot 611. In an embodiment, after a subcategory is selected, a user may scroll the media objects 620 in the media object ribbon 625. The media objects 620 presented in the media object ribbon 625 may be based on both the selected active subcategory and the selected active category. In an embodiment, a user may scroll and select from media objects based on the active category and subcategory.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 presents a plurality of categories at block 702. In an embodiment, the categories may be scrollable through an active category slot positioned in a fixed or defined position in a first ribbon. In an embodiment, the first ribbon may be a vertical column. In an embodiment, a first set of categories may be presented on the first ribbon. After a user scrolls the category ribbon, a second set of categories may be presented as the categories may exit the viewable region as the category ribbon is scrolled. The second set of categories may include at least one category that is not a part of the first set of categories.

The logic flow 700 may receive a gesture from a user at block 704. In an embodiment, a gesture may be received via a gesture recognition system. In an embodiment, one or more predefined gestures may be received via a gesture recognition system. The gestures may scroll the category ribbon, select an active category, scroll the media objects ribbon, select an active media object, and/or navigate the action menu, among other examples.

The logic flow 700 may determine a category from the plurality of categories at block 706. The category may be positioned in the active category slot. In an embodiment, the active category slot may be positioned toward the center of the media object ribbon to enable a user to view categories above and below the active category slot. In an embodiment, a category may be determined based on a gesture from a user via a gesture recognition system.

The logic flow 700 may present a plurality of media objects in a second ribbon based on the category at block 708. In an embodiment, the second ribbon may be a horizontal row. The plurality of media objects may be scrollable through an active media object slot in a fixed or defined position in the second ribbon. In an embodiment, a first set of media objects may be presented. After a user scrolls the media object ribbon, a second set of media objects may be presented. The second set of media objects may include at least one media object which is not a part of the first set of media objects. In an embodiment, the media object ribbon may be scrolled based on a gesture from a user via a gesture recognition system.

Figure 8:
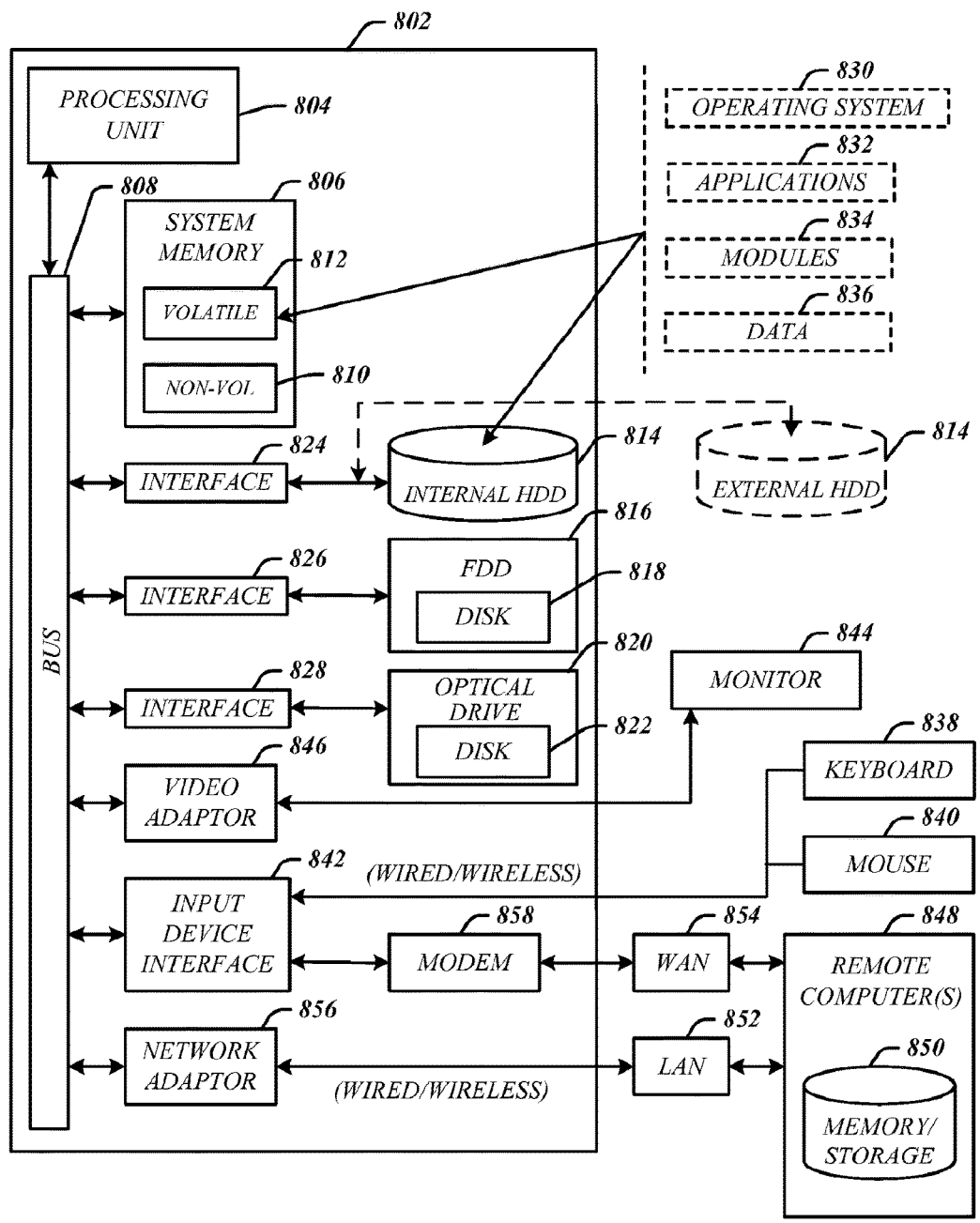
FIG. 8 illustrates one embodiment of a computing architecture.

FIG. 8 illustrates an embodiment of an exemplary computing architecture 700 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

The one or more application programs 832, other program modules 834, and program data 836 can include, for example, the display navigation component with the category presentation component, media object presentation component and the information panel and action menu presentation component.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
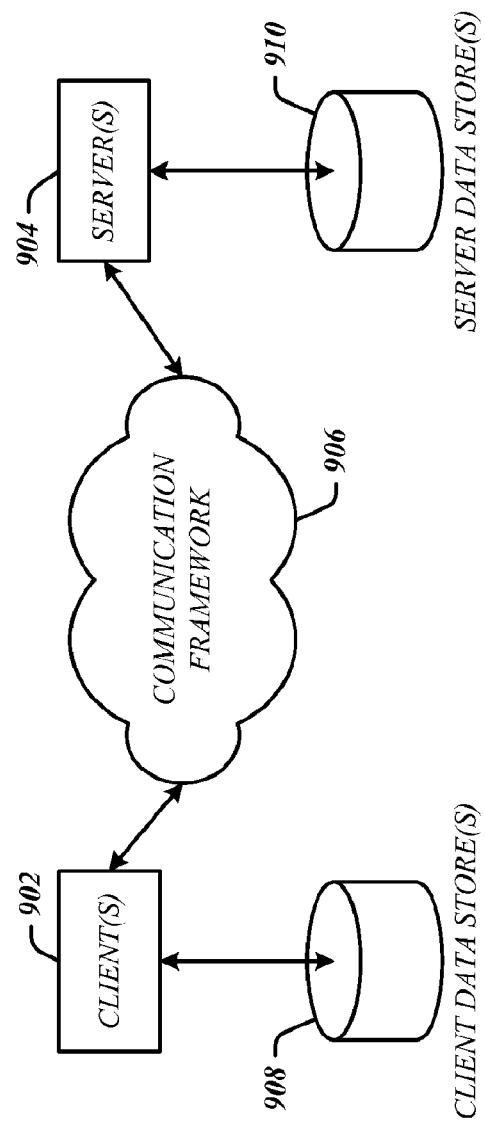
FIG. 9 illustrates one embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the client systems. The servers 904 may implement the server system. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols, such as those described with reference to systems 300, 400, 500, 600 and 800. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An article comprising a non-transitory machine-readable storage medium containing instructions that when executed enable a system to:
   present a multimedia stream on an electronic display;
   present a plurality of categories in a first ribbon on the electronic display, the plurality of categories scrollable through an active category slot in a fixed position in the first ribbon, the first ribbon parallel and adjacent to a first edge of the electronic display and disposed between the first edge of the electronic display and the multimedia stream;
   determine a category positioned in the active category slot from the plurality of categories;
   present a plurality of media objects based on the category, the plurality of media objects positioned in a second ribbon and scrollable through an active media object slot in a fixed position in the second ribbon, the second ribbon parallel and adjacent to a second edge of the electronic display and disposed between the second edge of the electronic display and the multimedia stream, the first edge substantially perpendicular to the second edge;
   determine a media object position in the active media object slot from the plurality of media objects;
   present an information panel with information based on the media object, the information panel disposed adjacent to the second ribbon and the multimedia stream, the information panel to indicate information based on one or more of the media object or the multimedia stream;
   present a plurality of subcategories in a third ribbon based on the category positioned in the active category slot, the plurality of subcategories scrollable through an active subcategory slot in a fixed position in the third ribbon, the third ribbon parallel and adjacent to the first ribbon and the information panel, the fixed position in the third ribbon adjacent to the fixed position in the first ribbon; and
   resize the multimedia stream such that the first ribbon, the information panel, and the third ribbon are disposed between the first edge of the electronic display and the multimedia stream and the information panel, the first ribbon, the second ribbon, and the third ribbon do not overlap the multimedia stream.

2. The article of claim 1, the active category slot of the third ribbon adjacent to the active category slot of the first ribbon, the non-transitory machine-readable storage medium comprising instructions that when executed enable the system to:
   present an action menu with one or more action items, the action menu disposed proximate to the information panel, the third ribbon, the multimedia stream, and the second ribbon.

3. The article of claim 2, the non-transitory machine-readable storage medium comprising instructions that when executed enable the system to:
   present the action menu with a first action item of the one or more action items based on the multimedia stream;
   present the action menu with a second action item of the one or more action items based on the category;
   present the action menu with a third action item of the one or more action items based on the media object; and
   present the action menu with a fourth action item of the one or more action items based on a subcategory of the plurality of subcategories currently in the active subcategory slot.

4. The article of claim 3, the non-transitory machine-readable storage medium comprising instructions that when executed enable the system to determine a category from the plurality of categories comprises instructions that when executed enable a system to determine a category based on a first gesture from a user.

5. The article of claim 4, the non-transitory machine-readable storage medium comprising instructions that when executed enable a system to:
   determine a media object from the plurality of media objects based on a second gesture from the user.

6. The article of claim 5, the non-transitory machine-readable storage medium comprising instructions that when executed enable the system to:
   determine a subcategory positioned in the active subcategory slot from the plurality of subcategories; and
   present the plurality of media objects which are positioned in the second ribbon, based at least in part on the subcategory.

7. The article of claim 6, the non-transitory machine-readable storage medium comprising instructions that when executed enable the system to:
   present the third ribbon concurrently on the electronic display, together with the first ribbon.

8. The article of claim 6, the non-transitory machine-readable storage medium comprising instructions that when executed enable the system to:
present the third ribbon disposed between the first ribbon and the multimedia stream.

9. The article of claim 6, the non-transitory machine-readable storage medium comprising instructions that when executed enable the system to:
move, resize, or move and resize at least one of the multimedia stream or another object presented on the electronic display, to prevent the third ribbon from overlapping the multimedia stream and/or the another object, on the electronic display.

10. The article of claim 1, the non-transitory machine-readable storage medium comprising instructions that when executed enable a system to:
present a cursor in the second ribbon;
receive a back input command from a user; and
responsive to receipt of the back input command, present the cursor in the first ribbon to allow a user to select a new category.

11. The article of claim 1, the non-transitory machine-readable storage medium comprising instructions that when executed enable a system to:
enlarge a size of the category positioned in the active category slot.

12. A method comprising:
presenting a multimedia stream on an electronic display;
presenting a plurality of categories in a first ribbon on the electronic display, the first ribbon parallel and adjacent to a first edge of the electronic display and disposed between the first edge of the electronic display and the multimedia stream, the categories scrollable through an active category slot positioned in a defined position in the first ribbon;
determining a category positioned in the active category slot from the plurality of categories;
presenting a plurality of media objects in a second ribbon based on the category, the second ribbon parallel and adjacent to a second edge of the electronic display and disposed between the second edge of the electronic display and the multimedia stream, the first edge perpendicular to the second edge, the plurality of media objects scrollable through an active media object slot in a defined position in the second ribbon;
determining a media object position in the active media object slot from the plurality of media objects;
presenting information in an information panel based on the media objects disposed adjacent to the second ribbon and the multimedia stream, the information panel to indicate information based on one or more of the media object or the multimedia stream, and, wherein the first ribbon and the second ribbon do not overlap the multimedia stream;
presenting a plurality of subcategories in a third ribbon based on the category positioned in the active category slot, the plurality of subcategories scrollable through an active subcategory slot in a fixed position in the third ribbon, the third ribbon parallel and adjacent to the first ribbon and the information panel, the fixed position in the third ribbon adjacent to the fixed position in the first ribbon; and
resizing the multimedia stream such that the first ribbon, the information panel, and the third ribbon are disposed between the first edge of the electronic display and the multimedia stream.

13. The method of claim 12, the active category slot of the third ribbon adjacent to the active category slot of the first ribbon, the method comprising:
presenting an action menu with one or more action items based on the media object.

14. The method of claim 12, comprising:
presenting a first set of categories in the first ribbon; and
presenting a second set of categories after a user scrolls the first ribbon, the second set of categories comprises at least one category which is not a part of the first set of categories.

15. The method of claim 12, comprising:
enlarging a size of the category positioned in the active category slot.

16. The method of claim 12, comprising:
presenting a first set of media objects in the second ribbon; and
presenting a second set of media objects after a user scrolls the second ribbon, the second set of media objects comprises at least one media object which is not a part of the first set of media objects.

17. The method of claim 12, comprising:
presenting a cursor in the second ribbon;
receiving a back input command from a user; and
responsive to receipt of the back input command, presenting the cursor in the first ribbon to allow a user to select a new category.

18. The method of claim 12, a media object from the plurality of media objects comprises a video clip from a multimedia stream.

19. The method of claim 12, a media object from the plurality of media objects comprises a pre-recorded video clip.

20. The method of claim 12, the category comprises an icon.

21. The method of claim 12, comprising:
determining a media object from the plurality of media objects via a gesture recognition system.

22. An apparatus comprising:
a processing circuitry; and
memory coupled to the processing circuitry, the memory comprising instructions that when executed by the processing circuitry cause the processing circuitry to navigate a graphical user interface (GUI) view comprising:
a multimedia stream disposed on a first vertical edge and a first horizontal edge of the GUI;
a first vertical column comprising a plurality of categories, the plurality of categories scrollable through an active category slot in a fixed position in the first vertical column, the first vertical column disposed on a second vertical edge of the GUI;
a horizontal row comprising a plurality of media objects based on a category positioned in the active category slot, the media objects scrollable through an active media object slot in a fixed position in the horizontal row, the horizontal row disposed on a second horizontal edge of the GUI, wherein the first vertical column and the horizontal row do not overlap the multimedia stream;
an information panel with information based on one or more of a media object positioned in the active media object slot of the multimedia stream, the information panel disposed proximate to the first vertical column and adjacent to the multimedia stream; and a second vertical column comprising a plurality of subcategories based on the category positioned in the active category slot, the plurality of subcategories scrollable through an active subcategory slot in a fixed position in the second vertical column, the second vertical column parallel and adjacent to the first vertical column and the information panel, the fixed position in the first vertical column adjacent to the fixed position in the second vertical column, wherein the multimedia stream is resized such that the information panel, the first vertical column and the second vertical column are disposed between the second vertical edge of the GUI and the multimedia stream.

23. The apparatus of claim 22, the active category slot of the second vertical column adjacent to the active category slot of the first vertical column, the GUI view further comprising an action menu with action items based on a media object positioned in the active media object slot.

24. The apparatus of claim 22, instructions that when executed by the processing circuitry further cause the processing circuitry to receive control directives from a gesture recognition system to determine when a user scrolls through one or more of the vertical column and the horizontal row.

25. The apparatus of claim 22, further comprising:
a digital display coupled to the processing circuitry, the GUI presented on the digital display.

26. An article comprising a non-transitory machine-readable storage medium containing instructions that when executed enable a system to:
present a multimedia stream on an electronic display;
present a plurality of categories in a category ribbon on the electronic display, the plurality of categories scrollable through an active category slot in a fixed position in the category ribbon, the category ribbon parallel and adjacent to a first edge of the electronic display and disposed between the first edge of the electronic display and the multimedia stream;
determine a category positioned in the active category slot from the plurality of categories;
present a plurality of subcategories in a subcategory ribbon based on the category positioned in the active category slot, the plurality of subcategories scrollable through an active subcategory slot in a fixed position in the subcategory ribbon, the subcategory ribbon parallel and adjacent to the category ribbon;
resize the multimedia stream such that the category ribbon and the subcategory ribbon are disposed between the first edge of the electronic display and the multimedia stream;
present a plurality of media objects based on at least one of the category or the subcategory, the plurality of media objects positioned in a media object ribbon and scrollable through an active media object slot in a fixed position in the media object ribbon, the media object ribbon at an angle to at least one of the category ribbon or the subcategory ribbon, and disposed between a second edge of the electronic display and the multimedia stream, the first edge substantially perpendicular to the second edge; and
present an information panel with information based on a media object in the active media object slot, the information panel disposed adjacent to the subcategory ribbon and the multimedia stream, the fixed position in the category ribbon adjacent to the fixed position in the subcategory ribbon.

* * * * *